(12) United States Patent
Kaler

(10) Patent No.: US 7,756,924 B2
(45) Date of Patent: Jul. 13, 2010

(54) PEER COMMUNITIES

(75) Inventor: Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 11/316,158

(22) Filed: Dec. 21, 2005

(65) Prior Publication Data

US 2007/0140110 A1    Jun. 21, 2007

(51) Int. Cl.
G06F 15/16 (2006.01)
G06F 11/00 (2006.01)
G01R 31/08 (2006.01)
H04J 1/16 (2006.01)
H04J 3/14 (2006.01)
G08C 15/00 (2006.01)
H04L 1/00 (2006.01)
H04L 12/26 (2006.01)

(52) U.S. Cl. .................. 709/204; 709/229; 370/216; 370/217; 370/218; 370/238

(58) Field of Classification Search .................. None
See application file for complete search history.

(56) References Cited

U.S. PATENT DOCUMENTS

| 7,080,124 | B1 * | 7/2006 | Shankar ...................... 709/206 |
| 2002/0114341 | A1 * | 8/2002 | Sutherland et al. .......... 370/428 |
| 2002/0143855 | A1 * | 10/2002 | Traversat et al. ............ 709/202 |
| 2002/0143944 | A1 | 10/2002 | Traversat et al. ............ 709/225 |
| 2002/0147771 | A1 | 10/2002 | Traversat et al. ............ 709/203 |
| 2002/0156875 | A1 | 10/2002 | Pabla .......................... 709/220 |
| 2002/0184310 | A1 | 12/2002 | Traversat et al. ............ 709/204 |
| 2003/0056093 | A1 | 3/2003 | Huitema et al. ............. 713/156 |
| 2004/0148333 | A1 * | 7/2004 | Manion et al. ............... 709/201 |
| 2004/0148411 | A1 | 7/2004 | Blawat et al. ................ 709/229 |
| 2004/0148611 | A1 | 7/2004 | Manion et al. ............... 719/328 |
| 2005/0060669 | A1 * | 3/2005 | Lowles ........................ 715/867 |
| 2006/0168014 | A1 * | 7/2006 | Wang .......................... 709/206 |

OTHER PUBLICATIONS

Dimitrakos, et al., "*Contract Performance Assessment for Secure and Dynamic Virtual Collaborations*," 2003, IEEE Computer Society, Seventh IEEE International Enterprise Distributed Object Computing Conference, available at http://ieeexplore.ieee.org/search/srchabstract.jsp?arnumber=1233838&isnumber=27649&punumber=8730&k2dockey=1233838@ieeecnfs&query=%28+peer+commnunities%3Cin%3Eab+%29&pos=1 (PDF enclosed entitled Article 1 , 13 pages).
Surridge, et al., "*Grid Security: Lessons for Peer-to-Peer Systems*," 2003, IEEE Computer Society, Third International Conference on Peer-to-Peer Computing, available at http://ieeexplore.ieee.org/search/srchabstract.jsp?arnumber=1231493&isnumber=27590&punumber=8717&k2dockey=1231493@ieeecnfs&query=%28+peer+communities%3Cin%3Eab+%29&pos=2 (PDF enclosed entitled Article 2 , 5 pages).

* cited by examiner

Primary Examiner—Hussein Elchanti
Assistant Examiner—Ho Shiu
(74) Attorney, Agent, or Firm—Workman Nydegger

(57) ABSTRACT

A software architecture that permits for a unified mechanism for interfacing with multiple peer groups. The architecture includes multiple peer group interfaces, each facilitating communication between computing systems in a corresponding peer group. In addition, a perhaps configurable number and type of service modules are configured to use the peer group interfaces to facilitate communication between peer groups in a manner that facilitates the service. A peer community application program interface is configured to allow one or more peer applications to enlist the services of the plurality of services by interfacing with the peer community application program interface.

27 Claims, 4 Drawing Sheets

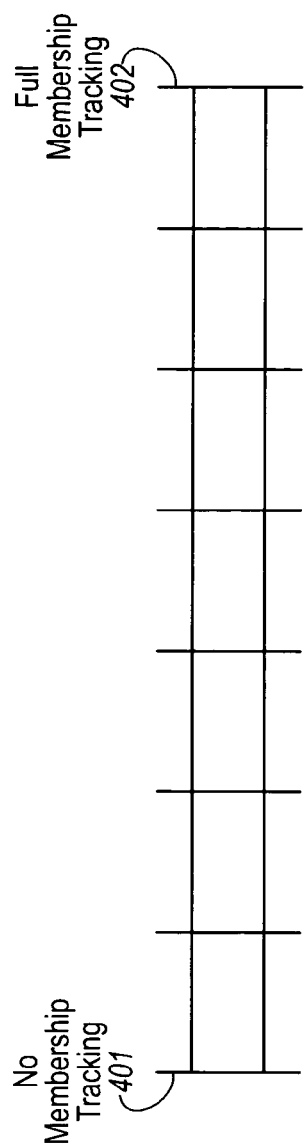
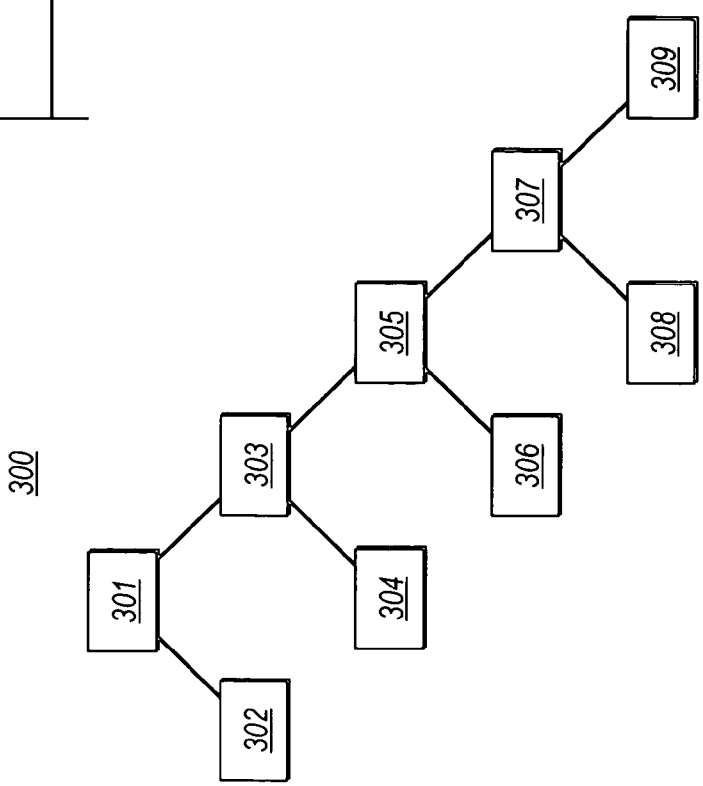
Fig. 4
Fig. 3

PEER COMMUNITIES

BACKGROUND

Background and Related Art

Computing technology has transformed the way we work and play. Computing systems (hereinafter also referred to simply as "computers") now take a wide variety of forms including servers, grid computing systems, desktop computers, laptop computers, tablet PCs, Personal Digital Assistants (PDAs), household appliances and devices, and the like. In its most basic form, a computing system includes system memory and one or more processors. Software in the system memory may be executed by the processor to direct the other hardware of the computing system to perform desired functions.

Some functions require the communication of multiple computing systems either directly or through a network. Although the number of such network functions is practically unlimited, examples include e-mail, gaming, Web access, conferencing, grid computing, and many others. Accordingly, modem computers often include functionality for communicating with other computers. For example, a modem computer may include a dial-up connection modem or a network interface card for connection to other computers using a local or wide-area network.

Computers can be interconnected in various topologies. For example, one topology is a server/client topology. In a server/client topology, a central authority maintains control over the network organization. The central authority can provide routing functionality by providing network addresses to clients on the network. When the central authority becomes disabled or non-functional, network communications can be hampered or completely disabled.

Another topology is a peer-to-peer topology. In a peer-to-peer topology, peers on a network use peer-to-peer protocols to become aware of one another and to send messages to one another. In a peer-to-peer network, no central authority is necessary to define the network organization. Rather peer-to-peer networks are formed as a self selected group assembled for a purpose. Rather than requiring a central authority to identify network members, the peers in a peer-to-peer network can identify network members by providing and examining tokens, sharing a common encryption or key, and the like. Conventionally, peer infrastructures are focused on a single peer group.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The principles of the present invention relate to (among other things) a software architecture that permits for a unified mechanism for interfacing with multiple peer groups. The architecture includes multiple peer group interfaces, each facilitating communication between computing systems in a corresponding peer group. In addition, a perhaps configurable number and type of service modules are configured to use the peer group interfaces to facilitate communication between peer groups in a manner that facilitates the service. A peer community application program interface is configured to allow one or more peer applications to enlist the various service modules by interfacing with the peer community application program interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 schematically illustrates an example hierarchical tree of peer groups that may be used in one particular aspect of the principles of the present invention;

FIG. 4 illustrates a logic representation of a sliding scale of membership tracking.

DETAILED DESCRIPTION OF THE PREFERRED EMBODIMENTS

Figure 1:
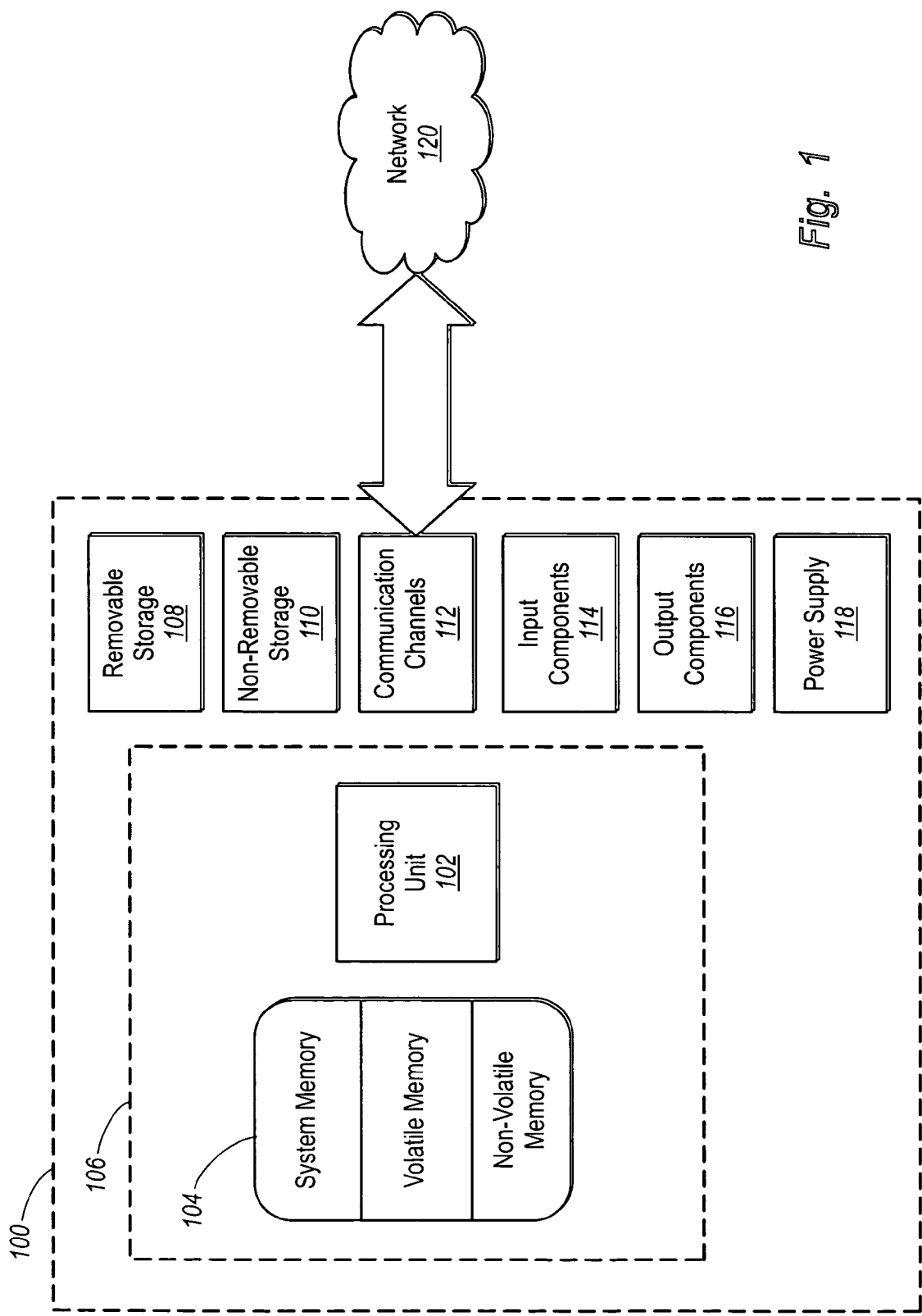
FIG. 1 illustrates a suitable computing system that may implement features of the present invention.

The principles of the present invention relate to (among other things) a software architecture that provides a unified mechanism for interfacing with multiple peer groups. Prior to describing the details of the principles of the present invention, a suitable computing architecture that may be used to implement the principles of the present invention will be described with respect to FIG. 1.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modulates running on a computing system.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. As used herein the term computer-readable media may refer to one or more computer storage media and/or one or more communication media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
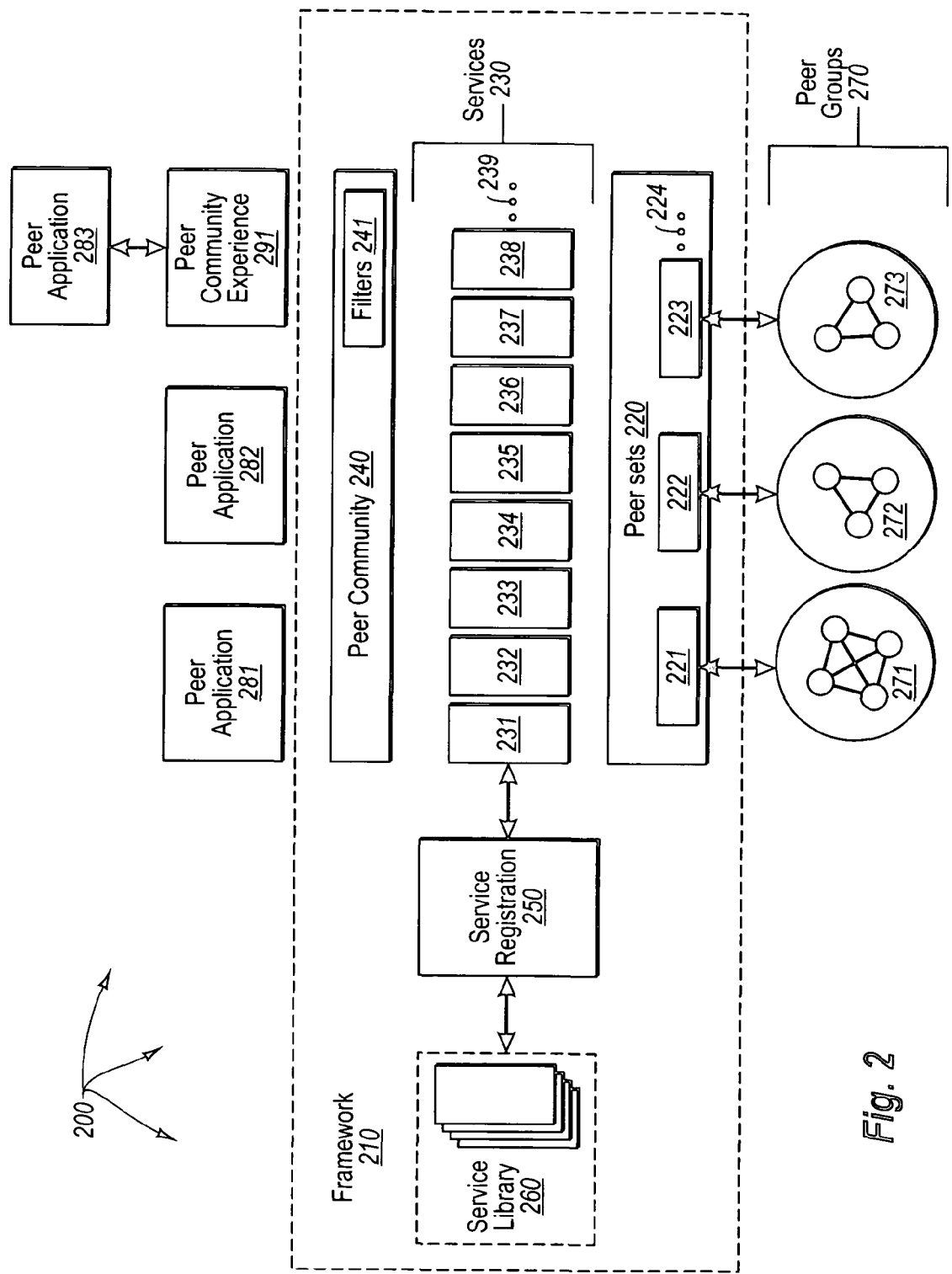
FIG. 2 schematically illustrates an architecture for providing a peer community in accordance with the principles of the present invention.

FIG. 2 illustrates a software architecture 200 that may be used to implement a peer community that allows the flexible use of peer-to-peer protocols to allow communication between all computing systems in the peer community. Although not required, the computing system 100 of FIG. 1 is an example of a computing system that may represent one or more nodes in the peer community. The principles of the present invention allow for the convenient construction and implementation of robust peer-to-peer applications that are founded upon communications between even multiple peer groups.

The software architecture 200 may be persisted in non-volatile storage and/or may be an in-memory representation. The software architecture 200 includes a framework 210 that includes multiple peer sets 220, multiple service modules 230, and a peer community module 240. The peer community module 240 may be, for example, a unifying Application Program Interface (API) that essentially wraps the various service modules 230 which build on the peer sets. These various components will now be described in further detail.

The peer sets 220 include any number of peer sets, although in the illustrated example peer sets 221, 222 and 223 are shown. There may be more peer set(s) as represented by the horizontal ellipses 224, or there may be perhaps just two peer sets. Each peer set acts as a peer group communication interface for an associated peer group that allows one peer in the peer group to communicate over an associated peer-to-peer protocol to one or more other peers in the peer group. A peer may be a computing system, or perhaps just a logical user account. For instance, peer set 221 is a communication interface for managing communication to and from peers in peer group 271; peer set 222 is a communication interface for managing communication to and from peers in peer group 272; and peer set 223 is a communication interface for managing communication to and from peers in peer group 273.

The peers groups supported by the peer sets 220 are represented generically by peer groups 270.

In this description and in the claims, a "peer group" is a set of entities (e.g., computing systems or peer accounts) that communicate with each other using peer-to-peer communication between the various peers in the peer group. In this description and in the claims, "peer-to-peer" communication does not imply that the communication is accomplished without the used of intermediary computing systems.

The peer groups may have any relationship whatsoever in terms of its membership. For instances, in one embodiment, a peer group may not be related at all to another peer group in that there are no members common to either. Alternatively, some or all of the members of one peer group may be included as members of another peer group. For instance, some of the members in peer group 271 may also be members of peer group 272, although not required.

Alternatively or in addition, some or all of the peer groups may be hierarchically structured, where each peer group represents a node in a hierarchical tree. For instance, FIG. 3 illustrates one hierarchical tree 300 which contains peer group nodes 301 through 309. Although a hierarchical tree structure can be arranged in any fashion, the example hierarchical tree 300 contains a root peer group 301 that has two child peer groups 302 and 303. Peer group 303, in turn, also has two child peer groups 304 and 305, which are grandchild peer groups to the root peer group 301. Similarly, peer group 305 has two child peer groups 306 and 307, and peer group 307 has two child peer groups 308 and 309.

The child-parent relationship may be established in the hierarchical tree in a number of ways. For instance, a peer group that contains peers that represent a subset of the peers in another group may be considered to be a child peer group of that other peer group. On the other hand, the parent-child relationship may be established in terms of an action to be performed on one of the peer groups. The hierarchy may be a feature of the peer group itself, or it may be something that the peer community 240 manages. The advantage of using the peer community to manage the peer group hierarchy is that uniformity is obtained in the hierarchy despite the underlying technologies implemented in the peer groups themselves.

For instance, suppose that an event is to be fired to one of the peer groups (e.g., peer group 305) using an eventing service module (such as the module described hereinafter) in response to a single invoking of the peer community module 240 by a peer application. In that case, the hierarchical tree may be used to specify other peer groups that are likewise to be fired the event. For instance, the event may be fired on one of the peer groups (e.g., peer group 305) and all of its descendent peer groups (e.g., peer groups 306 through 309), all of its ancestral peer groups (e.g., peer groups 301 and 303), only its children peer groups (e.g., peer groups 306 and 307), only its immediate parent peer groups (e.g., peer group 303), only its grandparent peer groups (e.g., peer group 301), only its grandchildren peer groups (e.g., peer groups 308 and 309), or by any other specified hierarchical relationship.

The hierarchical tree may include all or only a portion of all of the peer groups managed by the peer sets 220. In addition, there may be multiple hierarchical trees. For instance, there might be one hierarchical tree specified for each of the three common signaling metaphors, namely, notifications, object replication, and messages. For instance, there may be a hierarchical tree for event notifications, one for object replication, one for messages, and so forth, each hierarchical tree potentially having its own unique structure and peer groups.

Referring back to FIG. 2, the framework 210 also includes service modules 230. There may be any number of service modules, although the service modules 230 are illustrated as including service modules 231 through 238. Each service module is configured to use at least one of the peer sets, and at least one of the service modules is configured to use multiple peer sets. In any case, any given service module may conceivably communicate with any number of peer group interfaces as needed to perform the service offered by the service module. Thus, in practical implementation, most or even all of the service modules may communicate with multiple peer sets to accomplish their corresponding service. In this sense, the service modules 230 are "built over" the peer sets 220. An example of a service module would be a hierarchy manager that manages the peer group hierarchy.

The framework 210 also includes peer community module 240. The peer community module 240 may be, for example, a unifying API that is exposed to peer applications above the unifying API such that the peer applications may enlist the services of the service modules 230 by interfacing in a defined way with the peer community application program interface 240. Accordingly, the peer community module 240 may also be represented herein as "peer community API" or "peer community Application Program Interface" to emphasis this is a significant embodiment of the peer community module.

The peer community application program interface 240 may also include input and output filters 241. With the increase in virus and worm attacks, it is important that communication channels allow automatic filtering of messages. Rather than having each peer application built over the peer community API 240, the peer community API 240 itself may perform this filtering, thereby reducing the coding requiring and complexity of peer applications. Alternatively or in addition, filtering may be performed individually for each signaling metaphor. For instance, event notifications may be filtered within an eventing service module, object replication may be filtered within an replication service module, and message may be filtered in each of the peer sets. The filters 241 may also make use of the services 230.

The peer community API 240 allows filters to be registered. For instance, the peer community API 240 may contain default filters, a function call that permits registering or removal of filters and/or a set of rules whereby filters are registered or removed. These filters may, for example, automatically reject messages or augment messages or invoke code to do the same. This allows, for example, a filter to run on any file sent or received over Instant Messaging (IM). Registration may be done on various granularities (e.g., for all peer applications, for just one peer application, or for just one instance of a peer application).

Referring back to the service modules 230, the horizontal ellipses 239 represents that there is flexibility in the number and identity of the service modules 230. For instance, service modules may be added to or removed from the collection of service modules invokable by the peer community API 240. Thus, one service module may even replace another, or perhaps augment the services offered by a related service module. For example, a new eventing service module may augment services offered by an original eventing service module. Accordingly, the framework may optionally include a service registration module 250 that is configured to add and/or remove service modules to and/or from the service modules 230. Thus, the peer community API 240 wraps a set of service modules that can be easily augmented, removed, or replaced.

Whenever a peer community is created, it may then be determined which service modules are to be initially populated into the services offered by the peer community. For instance, there may be service modules that are populated into the peer community as a default. Alternatively or in addition, when a peer application submits a request to the framework to generate a new peer community, the request may also include or be followed by configuration information, which (among other things) might be used to identify the appropriate initial set of service modules.

The various service modules may be provided by the framework itself. For instance, service registration module 250 may access service library 260 for any native service modules offered by the framework. Each of these native services may be an object instance that is created by a corresponding factory object. Alternatively or in addition, the service module(s) may be provided through the peer community API 240. In that case, there would be a contract specifying a set of rules that the external service module must comply with in order to properly interface with both the peer community API 240 and the peer sets 220.

The framework 210 allows peer applications to be built above the peer community API 240. For instance, peer applications 281 and 282 are shown as being directly above the peer community API 240. Thus, peer applications 281 and 282 may directly call into the peer community API 240. Alternatively or in addition, there may a peer community experience module 291 built directly over the peer community API 240. This peer community experience module 291 may generically interface with the peer community API 240 in a manner that supports an entire peer application category.

For instance, suppose that the peer community experience module 291 supports all game applications. The peer community experience module 291 may offer function calls that are common to many or most game applications. For instance, the experience module may offer methods that permit a single function call to be used to invite other players to play a specified game, a function call to specify the number of players in the game, a function call that causes a turn to be skipped, a function call that causes a turn to be initiated, and so forth. A peer application 283 within the appropriate category may then be easily coded to be built above the peer community experience module 291. There may be other peer group experience modules that support other categories of peer experiences such as, for example, grid computing, instant messaging, and potentially many others. Each peer application may use any of the service modules depending on the functionality provided by the peer application.

The software architecture 200 has many benefits. In particular, the peer community API 240 may provide a wide variety of methods that make it easier to code and build peer applications. The peer applications can provide rich functionality since the peer community API 240 permits communication amongst multiple peer groups, without having to be concerned about the membership and/or peer-to-peer protocols of the underlying peer groups.

Having described the broad principles of the software architecture 200 of FIG. 2, various example service modules will now be described. Although not required, in one embodiment, the service modules 231 through 238 correspond to the following service modules respectively: enumeration module 231, discovery module 232, searching module 233, events module 234, voting module 235, replication module 236, scheduling module 237, and security module 238. Each will now be described in this order.

The enumeration module 231 provides membership lists across the entire peer community. It may do this by causing a peer group level enumeration to be performed in each of the peer sets 220, retrieving the results of the peer group level enumeration, and compiling the results into a community-wide enumeration. The enumeration module may also enumerate services and anything shared across instances of the community.

The discovery module 232 finds specific peers either by using presence information tracking or by performing multi-casting. Since the peer community may range in size from being very small to quite large, peer communities may provide a range of membership options. On one side of the scale, the community may tracks full membership and attempts to maintain a near accurate membership roster. On the other hand, this is impractical for groups with millions of peers. Thus, the aggressiveness of the tracking and discovery can be dialed back to recording who has been seen to not even recording anything. This variable membership tracking is illustrated in FIG. 4, which symbolically represents the variable membership tracking using a sliding scale. On the more aggressive side of the membership scale, there is full membership tracking 401. On the less aggressive side of the membership scale, there is no membership tracking 402. In between, there are intermediate levels of aggressiveness in membership tracking.

Members may be invited to peer communities either explicitly via a message or some out-of-band mechanisms, or implicitly by sharing a key. Participants can request membership by sending a join request. For scalability reasons, this may not a request/response message. That is, a join request is sent and if accepted, an invitation is sent. This also allows for some peers to choose whether to acknowledge a join request depending on whether the requestor is known. The peer community can also distribute and maintain black and white membership lists. This allows peers to blacklist and remove peers as an ad-hoc form of revocation.

The searching module 233 implements a community-wide searching protocol. For instance, the searching module 233 may cause search mechanism within each of the peer sets to find a particular item. On the other hand, since the peer community has great flexibility in defining peer groups, other searching solutions may be obtained. For instance, referring to FIG. 2, one of the peer groups (e.g., peer group 271) may be comprised of exclusively searching agents, which specialize in trolling the entire community and indexing in preparation for future search requests. Thus, the searching module 233 may interface with the appropriate peer set for that searching peer group. The results may be returned back from the searching peer group to the searching module.

Alternatively, perhaps multiple peers are interested in the results of the search. In that case, an impromptu peer group (e.g., peer group 272) could be set up consisting of all peers that are interested in the results. The searching module could then cause the results to be made available to that peer group by interfacing, directly or indirectly, with the peer set corresponding to the results peer group. For instance, the searching module 233 could post the results to a replication folder, which may then be replicated to the results peer group using, for example, replication module 236, described further below.

The events module 234 perform event notification management community-wide. The events module 234 may, for example, register events of interest to all or portions of the community, and register those peers that should be notified in the case of an event. The event module 234 may use the messaging provided by the peer sets 230 to cause appropriate event notification messages to be sent to the appropriate peer community members depending on the event. As described above with respect to FIG. 3, the peer groups may be organized as a hierarchical tree. The event notification targets may be specified by a position of the peer group within that hierarchical tree. For example, the event notification may be sent to a specific peer group and all of its ancestral or descendent peer groups in the hierarchical tree. The event notifications may also be to just a single peer group, or to all peer groups.

A voting module 235 may manage community-wide voting, by identifying when a vote should occur, identifying options for the voting, and by tallying results of the voting. For instance, communities may share and maintain distributed data. To manage this, the community may automatically elect a master peer and set of backup peers, and track the liveness of the master, in case failover of a backup to primary is required. The voting, tracking, and failover mechanisms can all be replaced as can the function that determines how the primary is picked (if a metric is used). Note that some data may be distributed and resolved without requiring a single master.

The following provides details on one possible embodiment of the voting module 235. The general purpose voting/election needs are varied depending on the precise nature of the community. Some types of votes include, for example, electing a leader, picking a movie or restaurant, obtaining a reference or opinion. To support this, the voting module 235 may support four styles of voting in one embodiment of the invention: 1) select a ordering (to a specific depth), 2) select preference sets for each slot (to a specific depth), 3) agree or disagree with a premise, and 4) specify a score for each candidate. In one embodiment of the invention the votes may operate in any one or more of the following contexts: 1) minimum quorum of votes needed, 2) requirements for minimum for/against, 3) set a time limit for voting, and 4) results shared with all voters or only with vote initiator.

The general model for voting may be as follows:

1) The initiator sends a vote request to all voters indicating the specifics and parameters of the vote;

2) Each participant determines their vote;

3) Responses are sent to all participants or to the initiator (depending on configuration);

4) If the responses are sent to everyone, and the necessary limits have already been reached, the voter need note vote; and 5) The initiator tallies the results for the application.

It should be noted that there are a lot of issues with voting semantics such as race conditions, communication failures, partitions, etc. Thus, a vote may be initiated with the one or more or all following parameters as specified in Table 1:

TABLE 1

| Parameter | Description |
|---|---|
| ID | A unique identifier for the vote |
| Type | A URI to indicate the vote type/context |
| Text | A text string for user prompting |
| Shared | Are responses set to requestor (shared) or all voters (not shared) |
| Quorum | The number of participants needed for a valid vote |
| YesLimit | The minimum number of approving votes needed (for Y/N) |
| NoLimit | The maximum number of disapproving votes (for Y/N) |
| TimeLimit | The maximum time in seconds to allow for voting results |
| Style | String ranking, Shared ranking, Score ranking |
| Depth | The number of results needed |
| Ties | Can a position have ties or must the system resolve them? |
| Closed | Is the candidate list fixed? |
| WriteIn | Are write-in candidates allowed? |
| Candidates | List of candidates |

Vote responses may echo the ID along with time information and may be secured. Also included may be the position/score rating for each candidate.

The replication module 236 facilitates data sharing across the peer community by interfacing with the various peer sets needed to perform various community-wide replication. As previously mentioned, object replication may occur across hierarchically structured peer groups. For instance, referring to FIG. 3, the target peer groups may be identified based on their relational position within the hierarchical tree 300. For instance, the target for replication may be peer group 305 and all of its descendents and/or all of its ancestors.

Replication may occur by establishing containers (e.g., file system folders) that have associated replication properties. In one embodiment, the containers may contain a "private" replication property, indicating that the content of the container is not to be replicated. The container might alternatively have a "public" replication property, indicating that the content of the container is to be pushed to other targets of the replication. Alternatively or in addition, the container might have an "on demand" replication property, in which the content is to be replicated on demand. A hybrid of push and on demand might be to push a portion of the content (e.g., file titles) while waiting for requests for the rest of the content before replicating the remainder of the content. The replication module would interface with the peer sets corresponding to each peer group that may be a target for replication, by adding upon the built in message services offered by each peer group. The replication module may correlate replication to a file system folder, wherein by dropping something into a file system folder on one peer, the replication module replications that item to one or more peer groups.

Figure 5:
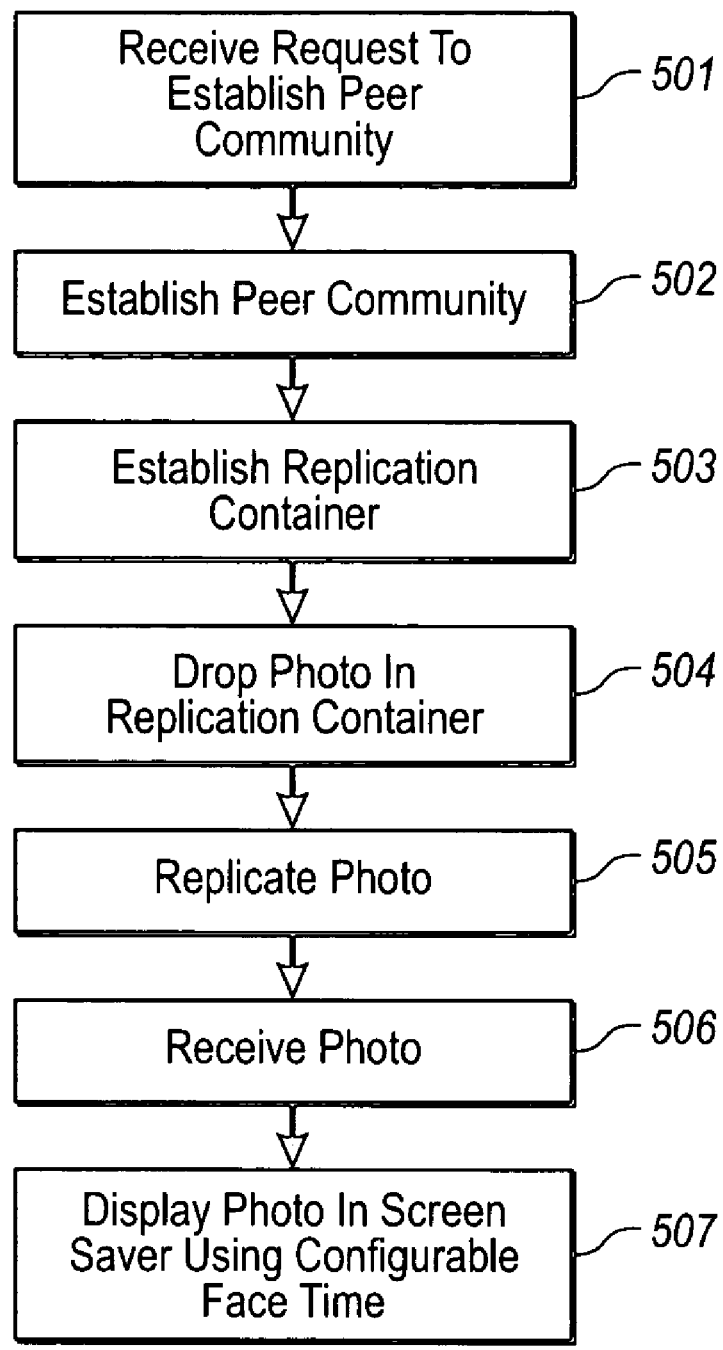
FIG. 5 illustrates a flowchart of a method for sharing photographs or other presentation media that may be realized using the peer community architecture in accordance with the principles of the present invention.

A particularly useful application of the replication module will now be described with respect to the flowchart of FIG. 5, which illustrates a method 500 for sharing photographs or other presentation media in accordance with one aspect of the principles of the present invention. Specifically, a peer application that offers photo-sharing (e.g., one or more of peer applications 281, 282 or 283) or other media sharing issues a request to establish a peer community (act 501), the peer community having multiple members spanning multiple peer groups. The peer community is established (act 502) along the general architecture illustrated and described with respect to the framework 210 of FIG. 2.

The media-sharing peer application uses the peer community API to cause the replication module to establish a replication media replication container (e.g., a folder) (act 503). After the user takes a photo or generates other media for sharing, the media is deposited into the container (act 504). The replication module detects that the media is deposited in the container, and thus causes replication to all of the members of the community (act 505). A similar media-sharing peer application on each of the member's computing systems contains configuration settings relating to how much presentation time the media should have on the peers computers (e.g., how much face time photos should have when a screen saver is displayed on the screen). Thus, when media is received (act 506), the media are rendered (e.g., the photos are then displayed) taking into consideration the configurable presentation time (act 507). In one embodiment, the peer community may be a family that communicates using different peer-to-peer protocols. Thus, in a photo-sharing peer setting, siblings may choose to have their own immediate family's pictures displayed most often, while parents may choose to have all of their childrens' families pictures displayed in equal proportion.

A scheduling module 237 performs community-wide scheduling. This might be as simple as performing specified actions at specified times, but may also be more complex. For instance, the scheduling module 237 may managing work scheduling in a grid computing experience, an example embodiment being now described.

For instance, in a grid computing experience, clients submit job requests, and agents route requests to workers. Workers perform job requests, and provide the results back to the agents. The agents then route the results back to the clients. The scheduling service may provide generalized work queue management. Furthermore, custom variations on scheduling may be provided for turn-taking games and other serialized activities.

There are a number of application patterns which require a work scheduler. That is, one elected peer makes decisions about what other peers should do. Because this exact pattern may not work for all applications, the scheduler component can be replaced.

An example default scheduler takes requests from one input queue, optionally backs up the request on a separate queue, and then farms the work to a collection of peers. Work assignments can be randomly assigned to peers, round-robin assigned to peers, or assigned using some other criteria. Optionally workers can remove themselves when busy to effect load balancing. Workers can also split requests into multiple sub-requests and queue the sub-requests. Results are communicated from a worker to the scheduling agent and then back to the requester. An application can use the mastership and failover mechanisms to provide a backup scheduling agent.

A security module 238 performs system wide security management. Since the community is quite flexible and may communicate using any number of communication mechanisms, the security module 238 likewise is comprehensive enough to allow security using any communication mechanism. For instance, the security module 238 may perform security based on 1) shared secrets, 2) public keys and 3) group keys.

Furthermore, the security module 238 allows for different types of communities. An open community allows everyone in. An authenticated community allows a peer into the community so long as they have authenticated themselves in some trusted way. An authorized community allows a peer (once authenticated) to perform an action in the community only if the peer is authorized to perform the action. A shared secret community requires knowledge of a shared secret in order to enter the community. A group key community allows membership so long as the peer has one of the private keys that corresponds to the group key. A delegation community permits entry so long as a trusted member of the community identifies the new peer as trusted.

The shared secret community may share a secret key that has a limited lifetime. Accordingly, there may be a need to occasionally re-key or re-issue a new shared secret for the community. In a wide-spread peer community this may occasion result in one peer having the old key, and one peer having the new key. In that case, there is an algorithm for resolving this potentially key conflict. An example of such a resolution algorithm will now be described.

The re-keying process may be initiated by the current master or the original creator of the group (or a delegate). A new key is issued and disseminated. For an established window, both keys are accepted. In the event that multiple or overlapping re-key events occur, each re-key has an associated disambiguator which can be used to pick a winner and eliminate the overlap.

If a peer finds that its key is no longer accepted but it has not yet received the updated key, it can issue a join request and receive an invitation with the new key. A join request can be sent to the membership group when it is secured using a group key. This is reserved for scenarios where a peer has not received the new key and wants to ask someone who knows the previous key for the new key. The join request may include an authentication signature as the primary signature with the group key as a supporting signature.

In the event that the primary has become disconnected, the ordered list indicates the number of delta intervals to wait before initiating a re-key. That is, the primary waits W units, the secondary waits W+D units, the tertiary waits W+D+D units, and so on. If a non-primary responds, it then also initiates a new vote.

When different secured partitions are discovered, it is necessary to unify the security. For symmetric keys this involves issuing the new key. For delegation certificate, this involves re-issuing the delegation chain or establishing an additional trust root. Partitions are discovered by trapping error conditions from the security channel. If the message indicates a different partition of a peer community, then the community instance issues a join request (based on a disambiguator) to obtain the key to the other partition, and then joins that partition. If the disambiguator indicates that the receiving instance is the unified partition, then the message is dropped and the other party will eventually issue a join request. A "HELLO" message may be sent to the other party to encourage the join request, although a Fault could also be sent.

When a peer instance initializes, it may create a partition ID. This is a text string consisting of the current time with a unique identifier, perhaps even a Globally Unique Identifier (GUID), appended. All peer messages carry this in a custom header. When a message is received that has a partition ID that is different, a unification takes place. Ideally the "larger" partition absorbs the "smaller", but identifying which partition is larger is not easily determined. Consequently, the larger partition may be estimated using time specified in the text string. That is, the older a partition, the more likely it is to be a larger partition. Each peer performs a lexical comparison of the partition IDs and the lexically smaller wins. Since the first portion is time, then, to the extent that time clocks are roughly synchronized, then the older will win. If two times collide, the random unique identifier ensures that only one will win and all parties can predict which one. An advantage of this is that the parties will deterministically arrive at the same conclusion given the same input.

While time is specified as a component, the algorithm is strictly just a string comparison. The clocks that generate the time for the string need not be synchronized and could even return a constant value and the algorithm will function since the randomly generated GUIDs would still provide some level is certainty. This algorithm also relies on the fact that valid participants can request membership and will eventually be granted the key. To ensure this, if an initial join request does not yield a response, the join request is directed at the peer that originally invited it if that peer is still around. If that peer is not available, then requests may be made to other members of the previous partition as they will now share a key.

There are several key advantages to the specific embodiment of the peer community just described. Specifically, all three common signaling metaphors are supported. For instance, peer applications may use messages, event notifications, or object replications. Furthermore, such signaling metaphors may be used with hierarchically structured peer groups thereby offering a flexible mechanism for signaling across multiple peer groups. Thus, the peer application may use the signaling metaphor that is most appropriate for the peer application, without having to build upon another signaling metaphor.

As a further advantage, the peer community has expandable services since the service registration module 250 is capable of inserting new services. For instance, the initial set of services just described may be expanded upon to include other services that might also be advantageous for a peer community. For instance, a caching service may be used to cache work requests in a grid computing environment, or perhaps a search request could be cached to be performed at some future designated time. A reputation service may be helpful in allowing the peer community to establish some level of trust for other peers. Another advantage is the multiple peer sets and groups are abstracted allowing different communication technologies and topologies to all be in a single peer community.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. One or more non-transitory, computer-readable storage media having thereon computing executable instructions that, when executed by one or more processors of a computing system, cause the computing system to implement a computing architecture configured to perform a method for facilitating communication between a plurality of peer groups in a peer community, the computing architecture comprising the following elements which are configured to perform the following:

a plurality of peer groups interfaces, wherein each peer group interface facilitates communication between computing systems in a corresponding peer group within the peer community, wherein the peer community is configured to manage a peer group hierarchy such that uniformity is maintained among the peer group hierarchy despite any communication protocol or interface differences between the various peer groups in the hierarchy;

a plurality of service modules, wherein each service module uses at least one of the plurality of peer group interfaces to communicate with one or more computing systems in a peer group, at least one of the plurality of service modules being configured to use multiple peer group interfaces of the plurality of peer group interfaces to communicate with one or more computing systems in the peer group, the communication comprising sending at least one communication message to a specified set of peers, wherein each peer in the set has a user-specified hierarchical relationship to the message sender within the peer group hierarchy; and a peer community application program interface allowing one or more peer applications to enlist at least one of the services of the plurality of services by interfacing with the peer community application program interface, such that each service of the plurality of services is accessible by the one or more peer applications and is accessible by the one or more computing system in the peer group using the peer group interfaces, the peer community application program interface being further configured to automatically filter messages in communications between peer group computing systems, services and peer applications such that peer applications can be designed without including filtering functionality.

2. The one or more non-transitory, computer-readable storage media in accordance with claim 1, wherein the peer community application program interface is further configured to permit any combination of object replication, messaging, and eventing.

3. The one or more non-transitory, computer-readable storage media in accordance with claim 1, wherein the peer community interface is configured to re-key a shared key amongst the peer community.

4. The one or more non-transitory, computer-readable storage media in accordance with claim 1, wherein the peer community interface is configured to unify different secured partitions of the peer community.

5. The one or more non-transitory, computer-readable storage media in accordance with claim 1, wherein one of the plurality of peer group interface is for interfacing with an impromptu peer group that is set up for peers that are interested in a replication result.

6. The one or more non-transitory, computer-readable storage media in accordance with claim 1, wherein the computing architecture is configured to persist at least a portion of its state in non-volatile memory.

7. The one or more non-transitory, computer-readable storage media in accordance with claim 1, wherein the peer community interface is configured to allow peers to join the peer community by doing one or more of the following:

authenticate as a peer that a trusted member of the peer community has indicated is trusted; and issue a join request.

8. The one or more non-transitory, computer-readable storage media in accordance with claim 1, wherein the computing architecture further comprises:

a service registration module for registering new services modules that supplement or replace the plurality of service modules.

9. The one or more non-transitory, computer-readable storage media in accordance with claim 1, wherein the one or more non-transitory, computer-readable storage media comprises one or more physical storage media.

10. The one or more non-transitory, computer-readable storage media in accordance with claim 1, wherein the computing architecture further comprises:

a service registration module configured to add service modules to the plurality of service modules and/or remove service modules from the plurality of service modules.

11. The one or more non-transitory, computer-readable storage media in accordance with claim 1, wherein at least one of the plurality of peer groups is a subset of another of the plurality of peer groups.

12. The one or more non-transitory, computer-readable storage media in accordance with claim 11, wherein the plurality of peer groups are hierarchically structured, wherein at least one of the plurality of service modules may cause an action to be performed on one of the peer groups and all or a selected subset of its descendent peer groups in the hierarchical structure of peer groups in response to a single invoking of the peer community application program interface by a peer application.

13. The one or more non-transitory, computer-readable storage media in accordance with claim 11, wherein the plurality of peer groups are hierarchically structure, wherein at least one of the plurality of service modules may cause an action to be performed on one of the peer groups and all or a selected subset of its ancestral peer groups in the hierarchical structure of peer groups in response to a single invoking of the peer community application program interface by a peer application.

14. The one or more non-transitory, computer-readable storage media in accordance with claim 1, wherein the computing architecture further comprises:
one or more peer applications that make function calls into the peer community application program interface.

15. The one or more non-transitory, computer-readable storage media in accordance with claim 1, wherein the computing architecture further comprises:
at least one peer community experience module that makes function calls into the peer community application program interface and that supports a category of peer applications; and
at least one peer application that is within the category of peer applications, and that make function calls into the peer community experience module.

16. The one or more non-transitory, computer-readable storage media in accordance with claim 1, wherein the at least one peer community experience module is one of a plurality of peer community experience modules in the same category.

17. The one or more non-transitory, computer-readable storage media in accordance with claim 1, wherein at least one of the peer groups corresponding to the plurality of peer group interfaces communicate using a different peer-to-peer protocol than another of the peer groups corresponding to the plurality of peer group interfaces.

18. The one or more non-transitory, computer-readable storage media in accordance with claim 1, wherein at least one of the plurality of service modules is a discovery service module which implements variable membership tracking.

19. The one or more non-transitory, computer-readable storage media in accordance with claim 1, wherein the plurality of services modules includes at least one of the following services modules:
an enumeration service module configured to perform peer enumeration across multiple peer groups;
a discovery service module configured to perform discovery across multiple peer groups;
a searching module configured to perform searching across multiple peer groups; an events module configured to perform event notifications across multiple peer groups;
a voting module configured to facilitate voting across multiple peer groups;
a replication module configured to replicate data across multiple peer groups;
a scheduling module configured to perform scheduling across multiple peer groups; and
a security service module configured to enforce security across multiple peer groups.

20. The one or more non-transitory, computer-readable storage media in accordance with claim 1, wherein the plurality of services modules includes at least two of the following services modules:
an enumeration service module configured to perform peer enumeration across multiple peer groups;
a discovery service module configured to perform discovery across multiple peer groups;
a searching module configured to perform searching across multiple peer groups; an events module configured to perform event notifications across multiple peer groups;
a voting module configured to facilitate voting across multiple peer groups;
a replication module configured to replicate data across multiple peer groups;
a scheduling module configured to perform scheduling across multiple peer groups; and
a security service module configured to enforce security across multiple peer groups.

21. The one or more non-transitory, computer-readable storage media in accordance with claim 1, wherein the plurality of services modules includes all of the following services modules:
an enumeration service module configured to perform peer enumeration across multiple peer groups;
a discovery service module configured to perform discovery across multiple peer groups;
a searching module configured to perform searching across multiple peer groups;
an events module configured to perform event notifications across multiple peer groups;
a voting module configured to facilitate voting across multiple peer groups;
a replication module configured to replicate data across multiple peer groups;
a scheduling module configured to perform scheduling across multiple peer groups; and
a security service module configured to enforce security across multiple peer groups.

22. The one or more non-transitory, computer readable storage media in accordance with claim 1, wherein the plurality of service modules comprises a security service module that is configured to provide security based on all of 1) shared secrets, 2) public keys, and 3) group keys.

23. A system comprising at least one memory and at least one processor, the system comprising:
the memory storing a plurality of peer group interfaces, wherein each peer group interface facilitates communication between computing systems in a corresponding peer group within a peer community, wherein the peer community is configured to manage a peer group hierarchy such that uniformity is maintained among the peer group hierarchy despite any communication protocol or interface differences between the various peer groups in the hierarchy;
the memory storing a plurality of service modules, wherein each service module uses at least one of the plurality of peer group interfaces to communicate with one or more computing systems in a peer group, at least one of the plurality of service modules being configured to use multiple peer group interfaces of the plurality of peer group interfaces to communicate with one or more computing systems in the peer group, the communication comprising sending at least one communication message to a specified set of peers, wherein each peer in the set has a user-specified hierarchical relationship to the message sender within the peer group hierarchy;
the memory storing a peer community application program interface allowing one or more peer applications to enlist at least one of the services of the plurality of services by interfacing with the peer community application program interface, such that each service of the plurality of services is accessible by the one or more peer applications and is accessible by the one or more computing system in the peer group using the peer group interfaces, the peer community application program interface being further configured to automatically filter messages in communications between peer group computing systems, services and peer applications such that peer applications can be designed without including filtering functionality, wherein the plurality of services modules includes at least three of the following services modules:
- a service registration module configured to add service modules to the plurality of service modules and/or remove service modules from the plurality of service modules;
- an enumeration service module configured to perform peer enumeration across multiple peer groups;
- a discovery service module configured to perform discovery across multiple peer groups;
- a searching module configured to perform searching across multiple peer groups;
- an events module configured to perform event notifications across multiple peer groups;
- a voting module configured to facilitate voting across multiple peer groups;
- a replication module configured to replicate data across multiple peer groups;
- a scheduling module configured to perform scheduling across multiple peer groups; and
- a security service module configured to enforce security across multiple peer groups.

24. The system in accordance with claim 23, wherein the plurality of services modules includes at least two of the following services modules:
- a service registration module configured to add service modules to the plurality of service modules and/or remove service modules from the plurality of service modules, an enumeration service module configured to perform peer enumeration across multiple peer groups;
- a discovery service module configured to perform discovery across multiple peer groups;
- a searching module configured to perform searching across multiple peer groups;
- an events module configured to perform event notifications across multiple peer groups;
- a voting module configured to facilitate voting across multiple peer groups;
- a replication module configured to replicate data across multiple peer groups;
- a scheduling module configured to perform scheduling across multiple peer groups; and
- a security service module configured to enforce security across multiple peer groups.

25. The system in accordance with claim 23, wherein the system include at least a physical system memory amongst potentially other physical memory and/or storage.

26. The system in accordance with claim 23, wherein the system comprises one or more physical storage media.

27. A method for sharing photos between multiple peer computing system in a peer community using a screen saver, the method configured to perform:

- an act of receiving a request to establish a peer community, the peer community having multiple members spanning multiple peer groups, each peer group configured to communicate using a corresponding peer-to-peer protocol and at least one of a plurality of peer group interfaces, wherein each peer group interface facilitates communication between computing systems in the corresponding peer groups, wherein the peer community is configured to manage a peer group hierarchy such that uniformity is maintained among the peer group hierarchy despite any communication protocol or interface differences between the various peer groups in the hierarchy;
- an act of establishing the peer community, the peer community including a plurality of service modules, wherein each service module uses at least one of the plurality of peer group interfaces to communicate with one or more computing systems in a peer group, at least one of the plurality of service modules being configured to use multiple peer group interfaces of the plurality of peer group interfaces to communicate with one or more computing systems in the peer group, the communication comprising sending at least one communication message to a specified set of peers, wherein each peer in the set has a user-specified hierarchical relationship to the message sender within the peer group hierarchy;
- an act of using a peer community API associated with the peer community to establish a replication container as part of a peer community application, wherein the peer community API is one of the plurality of peer group interfaces that allow one or more peer applications to enlist at least one of the services of the plurality of services by interfacing with the peer community application program interface, such that each service of the plurality of services is accessible by the one or more peer applications and is accessible by the one or more computing system in the peer group using the peer group interfaces, the peer community application program interface being further configured to automatically filter messages in communications between peer group computing systems, services and peer applications such that peer applications can be designed without including filtering functionality;
- an act of receiving presentation media in the replication container;
- an act of replicating the photo to the multiple members of the peer community; and
- an act of displaying photos received from others in a screen saver in which the photos have a configurable face time in the screen saver.

* * * * *